United States Patent Office 2,849,494
Patented Aug. 26, 1958

2,849,494

2,2'-THIOBIS(POLYHALOPHENOLS)

Robert H. Cooper, Nitro, and Kenneth L. Godfrey, St. Albans, W. Va., assignors to Monsanto Chemical Company, St. Louis, Mo., a corporation of Delaware No Drawing. Application May 17, 1956
Serial No. 585,377

6 Claims. (Cl. 260—609)

This invention relates to the manufacture of 2,2'-thiobis(polyhalophenols) containing halogen substituents in at least the 4- and 6-positions. More particularly, the invention relates to improvements in the condensation of 2,4- and 2,4,5-halogen substituted phenols with sulfur halides to produce the corresponding 2,2'-thiobis phenols, a valuable class of antiseptics. Examples of phenol reactants comprise 2,4-dichlorophenol, 2,4-dibromophenol, 2,4,5-trichlorophenol and 2,4,5-tribromophenol.

Phenols containing halogen in both the ortho- and para-positions do not condense readily with sulfur halides but heating usually results in resinous products which are essentially useless as antiseptics. According to German Patent 583,055 di- and tri-halogenated phenols condense with sulfur chloride in the cold in the presence of high proportions of aluminum chloride to yield the corresponding sulfides. In particular 0.75 to 1.5 molecular proportions of anhydrous aluminum chloride are used per molecular proportion of phenol or in other words 100 to 200 pounds per pound mole. However, the yields are still very low. Furthermore, the use of technical 2,4-dichlorophenol gave even lower yields. Technical 2,4-dichlorophenol usually contains 2,6-dichlorophenol as the principal impurity. For example, a typical analysis is 89% 2,4-dichlorophenol, 8% 2,6-dichlorophenol, 1% 2,4,6-trichlorophenol with traces of hydrochloric acid, water and monochlorophenol. The crystallizing point of pure 2,4-dichlorophenol is 42.7° C. whereas that of the technical commercial grade is about 37° C. The impurities present in the latter adversely affect the yield. For example, as compared to the yield from pure 2,4-dichlorophenol the yield of 2,2'-thiobis(4,6-dichlorophenol) was reduced 4% by the addition of 2% 2,6-dichlorophenol prior to the condensation with sulfur dichloride. The addition of 5% 2,6-dichlorophenol reduced the yield 14%. Moreover, it is a difficult expensive operation to remove this impurity from the technical product. However, it has now been discovered in accordance with this invention that significantly higher yields are obtained by heating the reactants in the presence of low amounts of aluminum chloride.

The optimum ratio of aluminum chloride catalyst is about 5 pounds per pound mole of the 2,4-dichlorophenol. The quantity can vary somewhat. Anhydrous aluminum chloride is of course very sensitive to moisture and if the reagents are not perfectly dry, some of the catalyst will be destroyed so that a higher total addition will be required for optimum yield. In general the aluminum chloride should be at least 2.5 pounds but not more than 15 pounds per pound mol of 2,4-dichlorophenol and preferably within the range of 2.5–10 pounds.

As illustrative of the effect of the catalyst ratio on yields, a series of reactions was carried out under similar conditions by gradually adding sulfur dichloride to 2,4-dichlorophenol in carbon tetrachloride. 0.55 molecular proportion of sulfur dichloride was employed per mole of technical 2,4-dichlorophenol, crystallizing point 37° C. The reaction was carried out in carbon tetrachloride at about 50° C. The catalyst was then destroyed by the addition of water, the solvent removed by distillation and the residue neutralized, redissolved in an inert solvent and isolated from the solvent (monochlorobenzene, toluene or xylene) by cooling. The results are summarized below:

| $AlCl_3$, parts by weight per mole of 2,4-dichlorophenol | Percent yield on technical 2,4-dichlorophenol |
|---|---|
| 50 | 32.9 |
| 25 | 39.0 |
| 15 | 43.9 |
| 10 | 46.1 |
| 5 | 49.4 |
| 2.5 | 41.8 |

It is evident from the foregoing that the ratio of aluminum chloride has a striking effect upon the yield obtained. Reduction of catalyst effects not only a saving in catalyst coupled with an increased yield but has a further advantage of simplifying the operation since there is not such a large quantity of catalyst to be eliminated. The reaction of anhydrous aluminum chloride with water is quite violent and considerable foaming takes place.

As further illustrative of the invention a preferred embodiment is carried out as follows: A solution is prepared comprising 163 parts by weight of 2,4-dichlorophenol, crystallizing point about 37° C., 5 parts by weight of aluminum chloride and 450 parts by weight of carbon tetrachloride. To this solution 67 parts by weight of sulfur dichloride is gradually added over a period of about one hour at 48–52° C. During the addition the reaction mixture is stirred and stirring is continued for about an hour after the sulfur dichloride has been added, the temperature still being maintained at about 50° C. Thereupon is added 125–250 parts by weight of water and the product isolated. For example the mass may be filtered and the solids washed repeatedly with water and cold carbon tetrachloride and then dried. Alternatively, after the addition of water the solvent is removed by distillation, the aluminum chloride solution decanted, another portion of water added and the mass heated and stirred at about 90° C. The water layer is neutralized with sodium bicarbonate and decanted. The residue is dehydrated by heating to about 100° C. under vacuum and then dissolved in about 400–500 parts by weight of monochlorobenzene. The solution is filtered, cooled to 0–5° C. and the 2,2'-thiobis(4,6-dichlorophenol) separated by filtration and dried. A yield of 56–58% is obtained, M. P. 186–188° C.

As further embodiments of the invention, 163 parts by weight (1.0 mole) of 41.5–42.0° C. crystallizing point dichlorophenol was charged as a melt into a glass or glass-lined reactor fitted with stirrer and condenser. To the melt was added 5 parts by weight of anhydrous aluminum chloride and the mixture stirred while heating to 68° C. The temperature was then adjusted to the desired temperature of condensation recorded in the table below and a solution of 56.7 parts by weight of sulfur dichloride (0.55 molecular proportion) in 290 parts by weight of perchloroethylene added at a uniform rate over a 1.5 hour period. Agitation and temperature were maintained for an additional hour. The catalyst was then quenched by the addition of water, the reaction mixture filtered and the crude product recrystallized. The table relates reaction temperature and yields of crystallized 2,2'-thiobis(4,6-dichlorophenol).

| Reaction temperature, °C. | Yield, percent |
|---|---|
| 20–25 | 59.1 |
| 35–40 | 72.0 |
| 50 | 76.9 |
| 60 | 77.0 |
| 70 | 81.6 |
| 80 | 81.0 |
| 90 | 79.8 |

As illustrated, yields increase sharply by heating within the range of 35–90° C., preferably 50–80° C. The increased yields resulting from heating are surprising in view of the fact sulfur dichloride decomposes around 59° C. In this connection sulfur monochloride can be substituted for sulfur dichloride or one of the sulfur bromides used. Sulfur monochloride yields the same product in essentially equivalent yields. Another advantage from heating is that the proportion of sulfur halide can be reduced to the theoretical quantity whereas amounts greater than theoretical are required for maximum yields at lower reaction temperatures.

The reaction has been most successful in halogenated hydrocarbon solvents but other solvents inert to the reactants can be used. Monochlorobenzene, tetrachloroethane and heptane may be used although the yields have been somewhat lower with these solvents. Aliphatic hydrocarbon solvents should be free of unsaturates. Addition of the solvent with the sulfur dichloride is feasible in which case no solvent need be charged to the reactor initially. In fact optimum yields are obtained with high concentrations of the reactants. For purification by recrystallization toluene, perchloroethylene, xylene and monochlorobenzene are satisfactory.

It is intended to cover all changes and modifications of the examples of the invention herein chosen for purposes of disclosure which do not constitute departures from the spirit and scope of the invention.

This application is a continuation-in-part of application Serial No. 320,158, filed November 12, 1952, now abandoned.

What is claimed is:

1. The method of making a 2,2'-thiobis(halogen substituted phenol) containing halogen at least in the 4- and 6-positions which comprises heating at 50–90° C. the halogen substituted phenol selected from the class consisting of 2,4 and 2,4,5 halogen substituted phenols and a sulfur halide wherein the halogen is selected from a group consisting of chlorine and bromine in a solvent inert to the reactants in the presence of at least about 2.5 but not more than about 15 parts by weight of aluminum chloride per molecular weight of halophenol.

2. The method of making 2,2'-thiobis(4,6-dichlorophenol) which comprises heating at 50–90° C. 2,4-dichlorophenol and sulfur dichloride in a solvent inert to the reactants in the presence of more than 2.5 but not more than 15 parts by weight of aluminum chloride per one molecular weight proportion of 2,4-dichlorophenol.

3. The method of making 2,2'-thiobis(4,6-dichlorophenol) which comprises heating at 50–90° C. 2,4-dichlorophenol and sulfur dichloride in a chlorinated hydrocarbon solvent in the presence of at least about 2.5 but not more than about 15 parts by weight of aluminum chloride per one molecular proportion of 2,4-dichlorophenol.

4. The method of making 2,2'-thiobis(4,6-dichlorophenol) which comprises heating at 50–90° C. 2,4-dichlorophenol and sulfur dichloride in a solvent inert to the reactants in the presence of about 5 parts by weight of aluminum chloride per one molecular weight proportion of 2,4-dichlorophenol.

5. The method of making 2,2'-thiobis(4,6-dichlorophenol) which comprises heating at 50–90° C. technical 2,4-dichlorophenol containing 2,6-dichlorophenol and sulfur dichloride in a solvent inert to the reactants in the presence of more than 2.5 but not more than 15 parts by weight aluminum chloride per one molecular proportion of 2,4-dichlorophenol.

6. The method of making 2,2'-thiobis(4,6-dichlorophenol) which comprises heating at 50–90° C. 2,4-dichlorophenol and sulfur dichloride in a chlorinated hydrocarbon solvent in the presence of more than 2.5 but not more than 15 parts by weight of aluminum chloride per one molecular weight proportion of 2,4-dichlorophenol, adding water and filtering the product from the solvent-water mixture.

References Cited in the file of this patent

UNITED STATES PATENTS 2,760,988    Schetty                Aug. 28, 1956

FOREIGN PATENTS 583,055    Germany               Aug. 28, 1933